Patented June 1, 1943

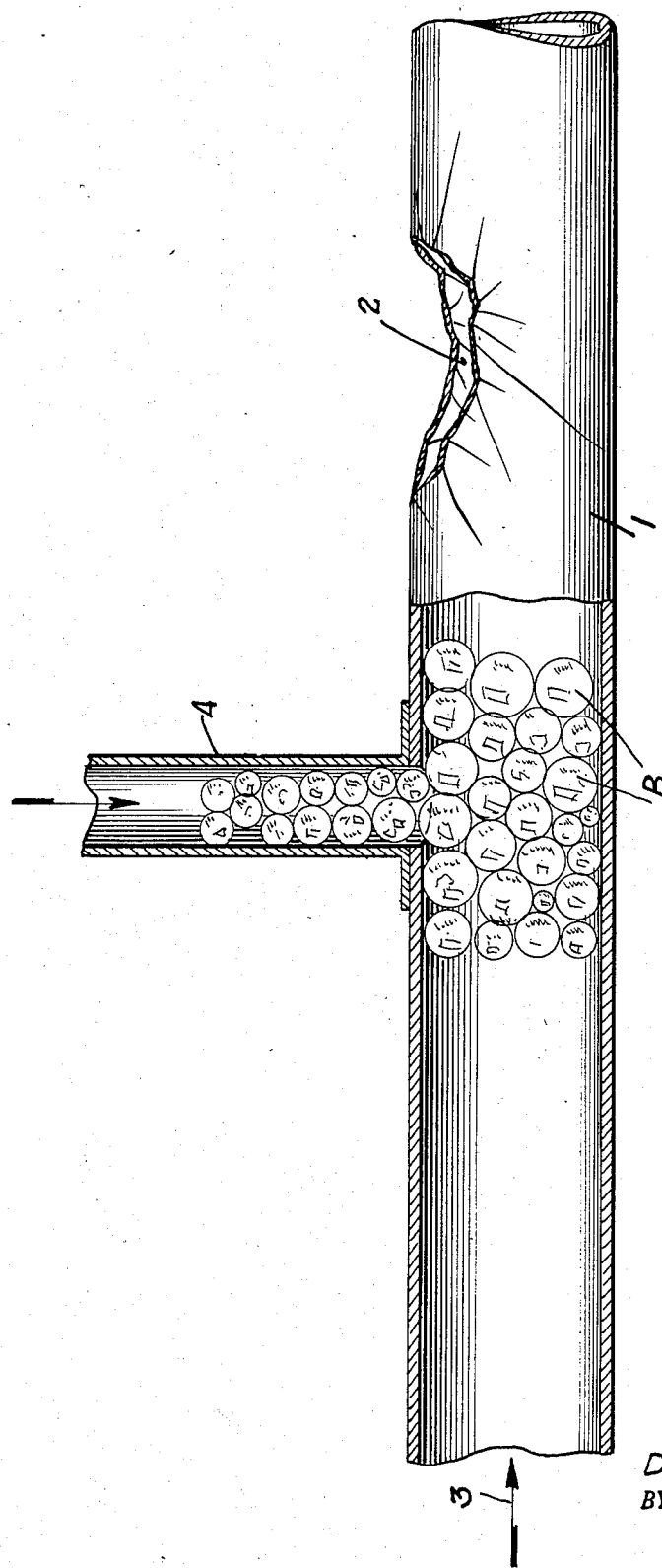

2,320,371

UNITED STATES PATENT OFFICE 2,320,371

METHOD OF PLUGGING GAS MAINS

Dennis J. Manning, Mountainside, N. J.

Application September 17, 1942, Serial No. 458,614

4 Claims. (Cl. 138—89)

My invention relates to a new and improved method of closing gas mains and to a new and improved closure for a gas main.

The principal object of my invention is to provide an extremely simple and inexpensive method whereby a gas main can be plugged between the gas tank or other source of gas, and a break or leak in the gas main. Said break or leak can be caused by an explosion or by a bomb or in any other manner.

According to my invention, I plug the gas main between the break or leak and the tank or other source, with a filling of small and tenacious bubbles, so as to produce a foam-plug.

The invention is further explained with reference to the annexed diagrammatic drawing.

The drawing shows a gas main 1, to which gas is supplied in the direction of the arrow 3 from a tank or other suitable supply source. The reference numeral 2 indicates a break or leak in the main 1. Of course, in some installations the gas flows to the place of use in opposed directions from the tank or other supply source, but this is immaterial for the purposes of the invention.

In supplying ordinary domestic gas in cities, the pressure of the gas is ordinarily low, between 3–14 inches of water.

Heretofore, when a break or leak occurred in a main for any reason, it has been proposed to plug up the main by inflating a rubber bag or diaphragm stopper which formed a closure at the interior wall of the main. Such devices were awkward to handle, and they have not been entirely satisfactory because of the length of time required to shut off the flow of gas. It has also been proposed to plug up the leak by a temporary filling of grease, which was difficult to remove after the emergency had passed.

In the annexed drawing, the inlet 4 diagrammatically indicates any inlet which is between the gas-supply and the break or leak 2. This inlet 4 may be a house inlet or any other inlet.

According to my method, bubbles in the form of a continuous foam are forced into the main through said inlet 4, so that said bubbles B adhere tenaciously to each other and to the interior wall of the main 1, so as to form a durable and efficient foam-plug. This foam-plug has a life of several hours, sufficient for the ordinary temporary emergency.

I can use various well-known compositions for producing said foam. For example, I can use the type of hand fire-extinguisher which is shown in U. S. Patent No. 858,188 to Laurent. This type of fire-extinguisher has separated gas-producing fire-extinguishing substances and a foam-producing substance, so as to produce a gas-filled foam, simultaneously with the evolution of the inert or fire-extinguishing gas or gases.

For example, such foam can be produced by intermixing an aqueous solution of aluminum sulphate and an aqueous solution of sodium bicarbonate and a suitable stabilizer. The aqueous solution of aluminate sulphate may contain 13% of aluminum sulphate by weight. The aqueous solution of sodium bicarbonate may contain 8% of sodium bicarbonate by weight, and a suitable stabilizer like saponin, licorice or Turkey-red oil.

Extinguishers of this type operate at relatively low pressure and they have a mixing chamber into which the respective solutions are caused to flow through restricted openings, upon inverting the extinguisher. The liquids which are thus intermixed in the mixing chamber, produce a foam which is ejected under pressure.

Since fire-extinguishers of this type are commercially well-known, and since the fine foam which is produced thereby under low pressure is also well-known, and since the invention is not limited to any particular apparatus or method for producing said foam, it is unnecessary to give further details of features which per se form no part of the invention.

I have discovered that a foam which consists of very small bubbles, and which is produced mechanically or chemically, will form a plug which will effectively close a gas pipe or gas main in a very short time, especially if the walls of the bubbles have very high adhesion to each other and to the interior wall of the pipe or main, and if said bubbles are stable.

Such a foam-plug can be easily broken up after the emergency has passed. It is therefore merely necessary for the repair workers to use these well-known portable fire-extinguishers, in order to plug pipes of small cross-section. Pipes or mains of larger diameter will require larger foam-producing equipment.

Whenever I specify a foam-plug or producing the same, the same can be produced in any manner without departing from the scope of the invention.

The foam can be produced externally of the pipe or main and then forced into the main, or the foam can be generated in any place, including the interior of the main. This depends on where I locate the nozzle of the apparatus in which the foam or bubbles are produced. Said nozzle may be external to the pipe or main or it may be inserted into the pipe or main at any place.

The bubbles can be formed individually and then caused to join in order to form the foam-plug, which consists of entire or partial connected bubbles.

I have shown a preferred embodiment of my invention, but it is clear that numerous changes and omissions can be made without departing from its spirit.

I claim:

1. A method of plugging a gas pipe or main, which consists in forming a coherent foam-plug in the interior of said gas pipe or main, said foam being sufficiently coherent and being sufficiently adherent to the interior wall of the gas pipe or main to withstand the pressure of the gas in said pipe or main.

2. A method of plugging a gas pipe or main, which consists in forming a coherent foam-plug in the interior of said gas pipe or main, said foam being sufficiently coherent and being sufficiently adherent to the interior wall of the gas pipe or main to withstand the pressure of the gas in said pipe or main, said foam consisting of interconnected bubbles which contain a gas which is selected from a class of gases which are inert to fire or which extinguish fire.

3. A plugging mass of foam in the interior of a gas pipe or main, said plugging mass of foam being sufficiently coherent and sufficiently adherent to the interior wall of the gas pipe or main to withstand the pressure of the gas in said gas pipe or main and to plug said gas pipe or main.

4. A method of plugging a gas pipe or main which consists in intermixing foam-producing ingredients exterior to said main to produce a coherent foam and forcing said foam into said pipe or main to plug the same, said foam being sufficiently coherent and being sufficiently adherent to withstand the pressure of the gas in said pipe or main.

DENNIS J. MANNING.